J. DENLEY.
Coffee Pot.
No. 29,253.
Patented July 24, 1860.
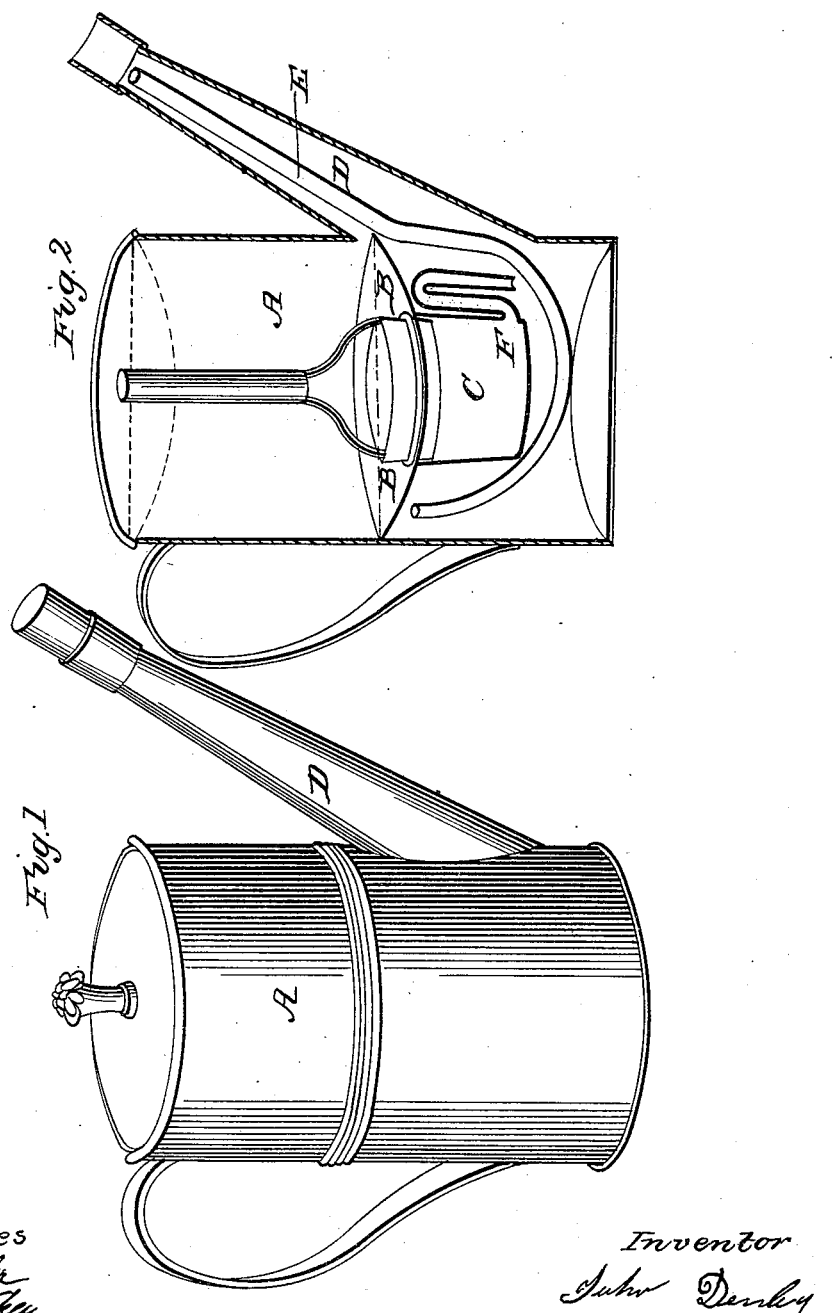

UNITED STATES PATENT OFFICE.

JOHN DENLEY, OF WARSAW, ILLINOIS.

COFFEE-POT.

Specification of Letters Patent No. 29,253, dated July 24, 1860.

*To all whom it may concern:*

Be it known that I, JOHN DENLEY, of Warsaw, in the county of Hancock and State of Illinois, have invented and made new and useful Improvements in Coffee-Pots, and do hereby declare that the following is a full, clear, and exact description of the construction and operation of the same, reference being had to the annexed drawings, making a part of this specification.

A, is the outer case of the coffee pot, which is made of the ordinary size and form, and has the usual spout D, attached. Arranged in the lower part of the spout is a cup C, of smaller diameter than the pot, and having a circular flange B, at its upper edge which flange is soldered tightly to the inner wall of the pot A, so as to sustain the cup C. The bottom of the cup is intended to be raised above the bottom of the pot A. The cup C, and flange B, constitute a partition which divides the interior of the pot into an upper and a lower chamber.

Attached to the lower part of the cup C, is a siphon tube F, which discharges into the lower chamber of the pot so that when the cup C, is filled with any liquid to a height above that of the arch of the siphon, the entire contents of the cup will pass into the lower chamber of the pot. Such passage of the contents of the cup C, will however be prevented if the cap which covers the spout D, is placed thereon because the air to be displaced by the entering liquid, must have egress through the spout D, or through the additional air pipe E, both of which are covered by the same cap.

The object of the small pipe E, which is arranged to extend from the tip of the spout to the interior of the lower chamber of the pot, is to admit air thereto while the contents of said chamber are being drawn off through spout D. The lower end of pipe E, is bent up so as nearly to reach the under surface of flange B, and thus prevent the liquid from entering pipe E. The position of the siphon F, may be varied without changing its operation in respect to the discharge of cup C.

In the upper edge of the cup a strainer is fitted composed of an open wire frame with a cloth stretched over it, so as to prevent the coffee grounds from passing into cup C. The ground coffee is put upon the upper part of the strainer.

The operation of the coffee pot is as follows. The cap is removed from spout D, and a small quantity of water (just enough to rise slightly above the level of the arch of the siphon F,) is poured into cup C, which immediately passes through the siphon into the bottom part or lower chamber of the pot A. The cap is now placed upon spout D, the strainer is introduced into the top of the cup C, the coffee is laid upon the strainer, the lid closed, and the pot placed on a stove or fire. As soon as the air contained within the lower part of the pot, below the flanges B, becomes heated it expands and by its pressure upon the surface of the water the latter is forced up through the siphon into the cup C, through it and the strainer and the coffee, the hot rising liquid extracting the strength from the coffee; as soon as the water is so heated that steam begins to escape from the lid the pot is removed from the fire, when the air becoming cool contracts, and the decoction descends into the lower part of the pot, from which it may be now drawn off through spout D, by removing the cap thereof. After removing the cap and before pouring the decoction, it may be diluted by pouring boiling water into cup C, to suit the taste.

Having thus described my invention I claim as new and desire to secure by Letters Patent—

The combination of the cup C, siphon F, and tube E, with the pot A, and spout D, as and for the purpose herein shown and described.

JOHN DENLEY.

Witnesses:
 WM. BRAUNER,
 RICHARD WIKEY.